United States Patent
Mehr et al.

(10) Patent No.: US 12,076,747 B2
(45) Date of Patent: Sep. 3, 2024

(54) METHODS AND SYSTEMS FOR FILLING CRACKS IN ENVIRONMENTAL BARRIER COATINGS AND THERMAL BARRIER COATINGS AND COMPONENTS FORMED THEREBY

(71) Applicant: HONEYWELL INTERNATIONAL INC., Charlotte, NC (US)

(72) Inventors: Mehrad Mehr, Morris Plains, NJ (US); John Downs, Morris Plains, NJ (US); Bahram Jadidian, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/056,345

(22) Filed: Nov. 17, 2022

(65) Prior Publication Data
US 2024/0165661 A1 May 23, 2024

(51) Int. Cl.
 *B05D 5/00* (2006.01)
 *B05C 3/18* (2006.01)
 *B05D 3/00* (2006.01)
 *B05D 3/02* (2006.01)

(52) U.S. Cl.
 CPC ............... *B05D 5/005* (2013.01); *B05C 3/18* (2013.01); *B05D 3/007* (2013.01); *B05D 3/0254* (2013.01)

(58) Field of Classification Search
 None
 See application file for complete search history.

(56) References Cited

U.S. PATENT DOCUMENTS

| | | | |
|---|---|---|---|
| 6,235,403 B1 * | 5/2001 | Vinden | B27K 1/00 427/393 |
| 11,325,869 B1 | 5/2022 | Lee et al. | |
| 2009/0308733 A1 | 12/2009 | Maloney et al. | |

(Continued)

FOREIGN PATENT DOCUMENTS

EP 2886526 A1 6/2015

OTHER PUBLICATIONS

XP025680595; Lan W et al. "Fabrication of yttria-stabilized-zirconia thick coatings via slurry process with pressure infiltration"; Journal of the European Ceramic Society, Elsevier, Amsterdam, NL; vol. 29 No. 3 pp. 391-401, Feb. 2009.

*Primary Examiner* — Michael P. Rodriguez
(74) *Attorney, Agent, or Firm* — Lorenz & Kopf LLP (57) ABSTRACT

Methods and systems are provided for filling cracks in an environmental barrier coating and/or a thermal barrier coating (EBC/TBC). The method comprises locating a component within an enclosure of an apparatus, the component including a substrate having the EBC/TBC thereon, wherein the EBC/TBC includes cracks extending from an exterior surface of the EBC/TBC toward the substrate, reducing pressure within the enclosure to a first pressure that is less than atmospheric pressure, applying a filler slurry to the exterior surface to cover the cracks while the EBC/TBC is exposed to the first pressure, increasing the enclosure to a second pressure that is greater than the first pressure, wherein the second pressure is sufficient to cause the filler slurry on the EBC/TBC to infiltrate into and fill the cracks, and sintering the filler slurry sufficient to cure the filler slurry within the cracks.

16 Claims, 5 Drawing Sheets

(56) References Cited

U.S. PATENT DOCUMENTS

| | | |
|---|---|---|
| 2011/0027559 A1 | 2/2011 | Kirby et al. |
| 2016/0214907 A1* | 7/2016 | Shim .................. C04B 35/573 |
| 2016/0281205 A1 | 9/2016 | Strock |
| 2017/0247787 A1* | 8/2017 | Saha .................. C04B 35/505 |
| 2018/0305263 A1 | 10/2018 | Shim |
| 2019/0284673 A1 | 9/2019 | Landwehr et al. |

* cited by examiner

METHODS AND SYSTEMS FOR FILLING CRACKS IN ENVIRONMENTAL BARRIER COATINGS AND THERMAL BARRIER COATINGS AND COMPONENTS FORMED THEREBY

TECHNICAL FIELD OF THE INVENTION

The present invention generally relates to turbine engine components, and more particularly relates to methods and systems for filling mud cracks within environmental barrier coatings and/or thermal barrier coatings.

BACKGROUND OF THE INVENTION

This section provides background information related to the present disclosure which is not necessarily prior art.

Certain high temperature engine components, such as those having a substrate comprising silicon nitride compositions, typically include an environmental barrier coating (EBC) and/or a thermal barrier coating (TBC) to protect the underlying substrate. One method of forming the EBC/TBCs is by direct sintering. However, direct sintering of EBC/TBCs, particularly disilicate-based EBC/TBCs on silicon nitride substrates, may result in patterns of mud crack on the EBC, that is, cracks extending from an exterior surface of the EBC toward the underlying substrate. These cracks need to be subsequently filled to produce a defect free or reduced defect EBC/TBC. Generally, these cracks are filled either by adding a subsequent layer or by applying a fill coat slurry on the sintered EBC/TBC and re-firing. However, these filling processes typically do not produce a defect free EBC/TBC. Instead, these processes typically result in remnant cavities at the bottom of the cracks (i.e., portions of the cracks closest to the substrate). These cavities define relatively large voids that act as crack initiation points potentially leading to lower substrate strength of the final components.

Accordingly, there is a desire for a system or method capable of filling mud cracks formed in EBC/TBCs that result in fewer remaining cavities. Furthermore, other desirable features and characteristics of the present invention will become apparent from the subsequent detailed description and the appended claims, taken in conjunction with the accompanying drawings and the foregoing technical field and background.

SUMMARY OF THE INVENTION

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for filling cracks in an environmental barrier coating and/or a thermal barrier coating (EBC/TBC). The method comprises locating a component within an enclosure of an apparatus, the component including a substrate and the EBC/TBC on the substrate, wherein the EBC/TBC includes cracks extending from an exterior surface of the EBC/TBC toward the substrate, reducing pressure within the enclosure to a first pressure that is less than atmospheric pressure, applying a filler slurry to the exterior surface of the EBC/TBC such that the cracks are covered with the filler slurry while the component is within the enclosure and the EBC/TBC is exposed to the first pressure, increasing pressure within the enclosure to a second pressure that is greater than the first pressure, wherein the second pressure is sufficient to cause the filler slurry on the EBC/TBC to infiltrate into and fill the cracks, and sintering the filler slurry sufficient to cure the filler slurry within the cracks.

A component is provided that is formed by a method that comprises locating a component within an enclosure of an apparatus, the component including a substrate and an environmental barrier coating and/or a thermal barrier coating (EBC/TBC) on the substrate, wherein the EBC/TBC includes cracks extending from an exterior surface of the EBC/TBC toward the substrate, reducing pressure within the enclosure to a first pressure that is less than atmospheric pressure, applying a filler slurry to the exterior surface of the EBC/TBC such that the cracks are covered with the filler slurry while the component is within the enclosure and the EBC/TBC is exposed to the first pressure, increasing pressure within the enclosure to a second pressure that is greater than the first pressure, wherein the second pressure is sufficient to cause the filler slurry on the EBC/TBC to infiltrate into and fill the cracks, and sintering the filler slurry sufficient to cure the filler slurry within the cracks.

A system is provided for filling cracks in an environmental barrier coating and/or a thermal barrier coating (EBC/TBC). The system comprises an apparatus having an enclosure configured to receive a component, the apparatus configured to control the pressure within the enclosure between a first pressure that is below atmospheric pressure and a second pressure that is above the first pressure, the component including a substrate and an environmental barrier coating and/or a thermal barrier coating (EBC/TBC) on the substrate, wherein the EBC/TBC includes cracks extending from an exterior surface of the EBC/TBC toward the substrate, a deposition device configured to apply a filler slurry to the exterior surface of the EBC/TBC such that the cracks are covered with the filler slurry while the component is in the enclosure and the EBC/TBC is exposed to the first pressure, wherein the second pressure is sufficient to cause the filler slurry on the EBC/TBC to infiltrate into and fill the cracks subsequent to application of the filler slurry to the exterior surface of the EBC/TBC, and a heating device configured to sinter the filler slurry sufficient to cure the filler slurry within the cracks.

Furthermore, other desirable features and characteristics of the [system/method] will become apparent from the subsequent detailed description and the appended claims, taken in conjunction with the accompanying drawings and the preceding background.

BRIEF DESCRIPTION OF DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Systems and methods disclosed herein provide for filling mud cracks resulting from processing (e.g., direct sintering) of environmental barrier coatings (EBCs) and/or thermal barrier coatings (TBCs) in a manner that results in the EBC/TBCs being substantially free of defects associated with the mud cracks or having a reduction of the quantity and/or size of such defects relative to conventional methods of filling mud cracks in EBC/TBCs. The systems and methods may be used/performed on various components comprising EBC/TBCs, including but not limited to turbine engine components (e.g., a shroud). In various embodiments, the components include substrates comprising silicon nitride. In various embodiments, the EBC/TBCs of the components include at least one layer comprising a rare-earth silicate, such as but not limited to ytterbium disilicate (YbDS, $Yb_2SiO_5$) and/or ytterbium monosilicate (YbMS, $Yb_2Si_2O_7$).

Figure 1:
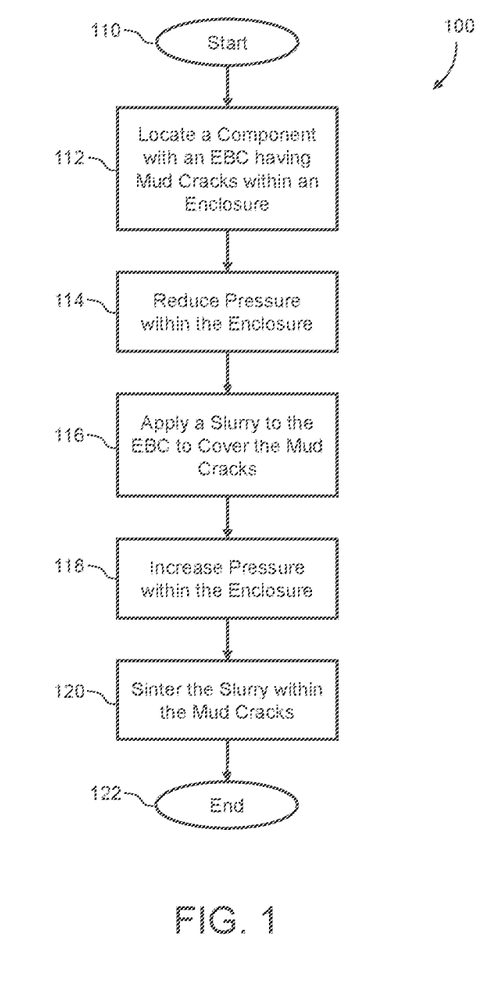
FIG. 1 is a flow chart illustrating a method of filling mud cracks in an environmental barrier coating and/or thermal barrier coating in accordance with an embodiment.

Referring initially to FIG. 1, a flow chart is provided illustrating an exemplary method 100 for filling mud cracks of an EBC/TBC. The method 100 may start at 110. The method 100 includes providing a component comprising a substrate and an EBC and/or a TBC thereon, wherein the EBC/TBC includes mud cracks, that is, cracks extending from an exterior surface of the EBC/TBC toward the substrate formed during fabrication of the component. Methods of fabricating the substrate are well known in the art and therefore will not be discussed herein. Various methods may be used to fabricate the EBC/TBC and any underlying layers, if present, between the EBC/TBC and the substrate. In various embodiments, the EBC/TBC may be fabricated via a direct sintering process that includes, for example, applying an EBC/TBC slurry to the substrate or underlying layers and then heating the EBC/TBC slurry to coalesce powder material within the EBC/TBC slurry to form a solid or porous layer (without liquefaction) that defines the EBC/TBC. The EBC/TBC may include various numbers of layers having various compositions and the mud cracks may penetrate one or more layers of the EBC/TBC.

The method 100 includes, at 112, locating the component or at least a portion thereof that includes the cracks within an enclosure of an apparatus configured to control the pressure of the enclosure. The method includes, at 114, reducing the pressure within the enclosure to a first pressure. In various embodiments, the pressure within the enclosure is reduced to produce a low pressure environment, that is, an environment having a pressure that is below atmospheric pressure (e.g., about 1 atm at sea level). As a nonlimiting example, the first pressure may be less than about 10 torr (about 1333 Pa), such as less than about 1 torr (about 133 Pa), such as between about 200 to 500 millitorr (about 26 to 67 Pa). Preferably, application of the low pressure environment promotes evacuation of substantially all gas from the mud cracks.

While maintaining the first pressure, the method 100 includes, at 116, applying a filler slurry to at least a portion of an exterior surface of the EBC/TBC such that the cracks are covered with the filler slurry. The filler slurry may be applied to the EBC/TBC in various manners such as, but not limited to, mechanically applying the filler slurry (e.g., brushing), immersing the EBC/TBC in a reservoir of the filler slurry, pouring the filler slurry onto the EBC/TBC, or flowing the filler slurry over the EBC/TBC. The filler slurry may include a mixture of solids suspended in carrier liquid (e.g., water). The solids may include, but are not limited to, particulates of a filler material intended to fill the mud cracks upon sintering of the slurry. In various embodiments, the slurry may have a viscosity of between about 5,000 to 200,000 cP (about 5,000 to 200,000 mPa·s).

After application of the filler slurry, the method 100 includes increasing the pressure within the enclosure to a second pressure that is greater than the first pressure. In various embodiments, the pressure within the enclosure is increased to produce an environment having a pressure that is substantially equal to atmospheric pressure. Increasing the pressure within the enclosure causes the filler slurry to infiltrate the cracks. Preferably, the change in pressure within the enclosure and the volume of the filler slurry applied to the EBC/TBC are, in combination, sufficient to ensure that the cracks are entirely or substantially entirely filled with the filler slurry.

Subsequent to completing the infiltration process, the method 100 include sintering the EBC/TBC to cure the filler slurry. The sintering process may be performed within the enclosure of the apparatus or with another apparatus. In various embodiments, subsequent to sintering, the cracks are filled with little to no cavities or voids.

The filler slurry may have various compositions. In various embodiments, the filler slurry may be formed by diluting the EBC/TBC slurry used to produce the EBC/TBC. In various embodiments, the filler slurry may be produced by diluting the EBC/TBC slurry with a carrier liquid sufficient to reduce a solid loading thereof, relative to the EBC/TBC slurry, by about 1 to 5 wt. %, such as 1 wt. %, 2 wt. %, 3 wt. %, 4 wt. %, or 5 wt. %, or more than 5 wt. %. In such embodiments, after sintering the cracks may be filled with a material having a composition that is substantially similar to the composition of the EBC/TBC.

In various embodiments, the method 100 may be used to fill cracks that have a depth (i.e., dimension extending from the exterior surface of the EBC/TBC toward the substrate) of about 3 mm or less, such as about 50 µm to 3 mm, such as about 50 µm to 250 µm, and a width (e.g., measured across the opening at the surface of the EBC/TBC) of about 3 mm or less, such as about 50 µm to 3 mm, such as about 50 µm to 300 µm.

Referring now to FIGS. 2-11, exemplary systems 200, 300, and 400 are provided for filling mud cracks of an EBC and/or TBC, for example, by implementing the method 100. In these figures, consistent reference numbers are used to identify the same or functionally related/equivalent elements, but with a numerical prefix (1, 2, or 3, etc.) added to distinguish the particular embodiment from other embodiments of the invention. In view of similarities between the embodiments, the following discussion may occasionally focus primarily on aspects of the embodiments that differ from one another in some notable or significant manner. Any aspects of a specific embodiment not discussed in detail can be, in terms of structure, function, materials, etc., essentially as was described for any of the other embodiments.

Figures 2, 3:
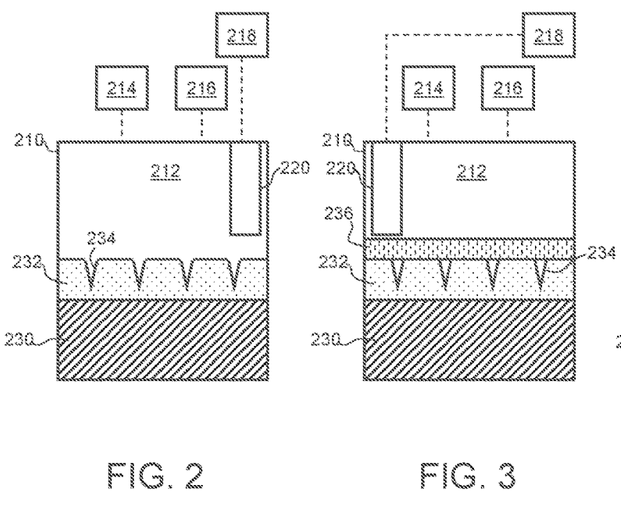
FIGS. 2, 3, and 4 represent a first system configured to filling mud cracks in an environmental barrier coating and/or thermal barrier coating in accordance with an embodiment.
Figure 4:
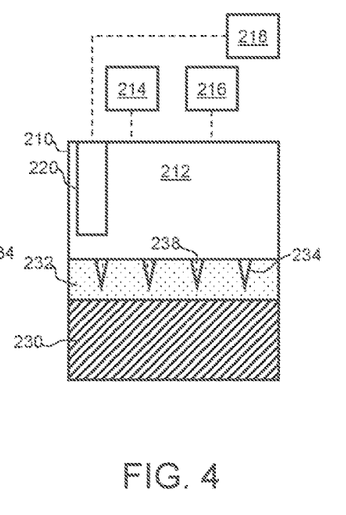

The first system 200 presented in FIGS. 2 through 4 includes an apparatus 210 (e.g., a vacuum chamber) having an enclosure 212 configured to receive and enclose at least a portion of a component having a substrate 230, an EBC/TBC 232 on the substrate 230, and mud cracks 234 in the EBC/TBC 232. The apparatus 210 is configured to control the pressure within the enclosure 212 with, for example, a vacuum pump 214, control the temperature within the enclosure 212 with, for example, a heating device 216, and receive a supply of a filler slurry 236 from a source 218.

FIG. 2 presents the component as located within the enclosure 212. At this stage, the enclosure 212 may be sealed and the vacuum pump 214 may be operated to evacuate gas from and reduce the pressure within the enclosure 212. Once a low pressure environment has been achieved within the enclosure 212, the apparatus 210 may deposit the filler slurry 236 using a deposition device 220. In the example represented in FIG. 3, the deposition device 220 may pour the filler slurry 236 onto a surface of the EBC/TBC 232 as the deposition device 220 transitions across the surface to cover the mud cracks 234.

Once application of the filler slurry 236 is complete, the pressure within the enclosure 212 may be increased to cause the filler slurry 236 to infiltrate the mud cracks 234. In various embodiments, increasing the pressure may be achieved by operating the vacuum pump 214 to increase the pressure. In various embodiments, increasing the pressure may be achieved by ceasing operation of the vacuum pump 214 and/or unsealing the enclosure 212 such that pressure equilibrium is achieved with an ambient environment. Thereafter, the heating device 216 may be operated to sinter the filler slurry 236 within the mud cracks 234 to produce a cured filler material 238 therein as represented in FIG. 4.

The second system 300 presented in FIGS. 5 through 8 includes an apparatus 310 (e.g., a vacuum chamber) having an enclosure 312 configured to receive and enclose at least a portion of a component having a substrate 330, an EBC/TBC 332 on the substrate 330, and mud cracks 334 in the EBC/TBC 332. Similar to the previous embodiment, the apparatus 310 is configured to control the pressure within the enclosure 312 with, for example, a vacuum pump 314, control the temperature within the enclosure 312 with, for example, a heating device 316, and receive a supply of a filler slurry 336 from a source 318.

Figure 5:
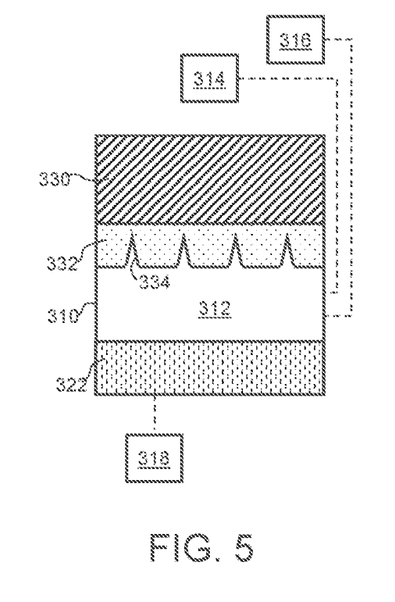
FIGS. 5, 6, 7, and 8 represent a first system configured to filling mud cracks in an environmental barrier coating and/or thermal barrier coating in accordance with an embodiment.
Figure 6:
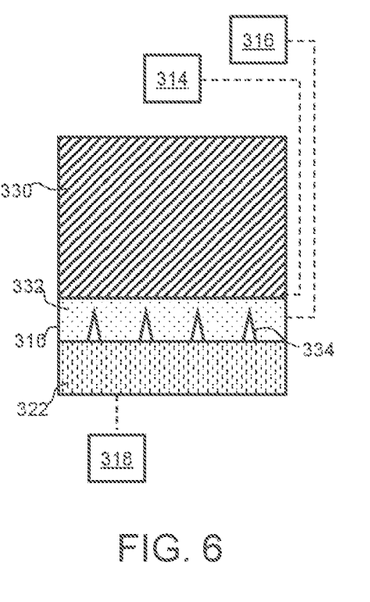
Figure 7:
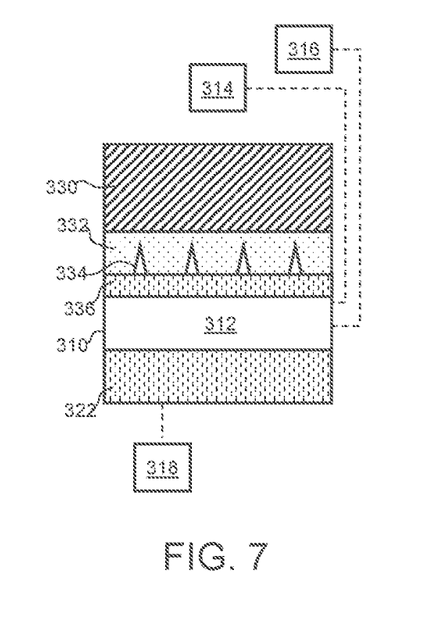
Figure 8:
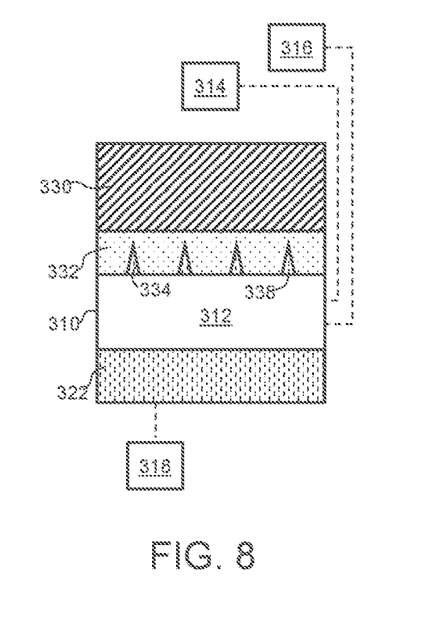

As with the previous embodiment of FIGS. 2 through 4, the apparatus 310 may be operated to seal the enclosure 312 and reduce the pressure therein to produce a low pressure environment (FIG. 5). In this embodiment, the component or a portion thereof comprising the mud cracks 334 may be immersed in a reservoir 322 of the filler slurry 336 (FIG. 6). Once removed from the reservoir 322 (FIG. 7), the pressure may be increased within the enclosure 312 to cause infiltration of the mud cracks 334 and sintering may be performed to cure the filler slurry 336 therein and produce the cured filler material 338 within the mud cracks 334 (FIG. 8).

Figure 9:
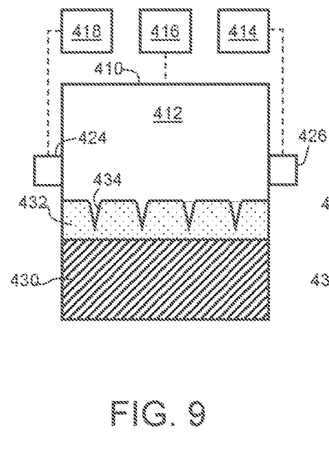
FIGS. 9, 10, and 11 represent a first system configured to filling mud cracks in an environmental barrier coating and/or thermal barrier coating in accordance with an embodiment.
Figure 10:
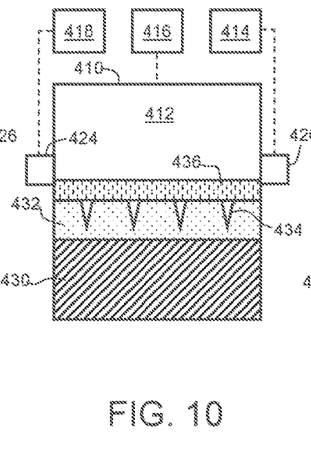
Figure 11:
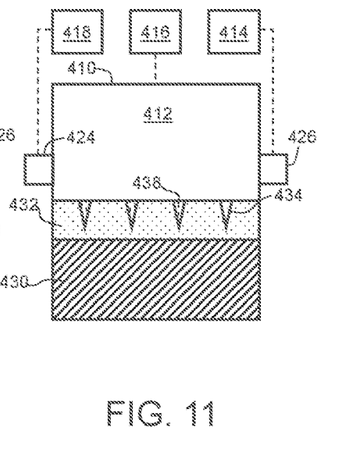

The third system 400 presented in FIGS. 9 through 11 includes an apparatus 410 (e.g., a vacuum chamber) having an enclosure 412 configured to receive and enclose at least a portion of a component having a substrate 430, an EBC/TBC 432 on the substrate 430, and mud cracks 434 in the EBC/TBC 432. Similar to the previous embodiments, the apparatus 410 is configured to control the pressure within the enclosure 412 with, for example, a vacuum pump 414, control the temperature within the enclosure 412 with, for example, a heating device 416, and receive a supply of a filler slurry 436 from a source 418.

As with the previous embodiments of FIGS. 2 through 8, the apparatus 410 may be operated to seal the enclosure 412 and reduce the pressure therein to produce a low pressure environment (FIG. 9). In this embodiment, the apparatus 410 includes a fluid inlet 424 and a fluid outlet 426. The vacuum pump 414 may be operated to produce the low pressure environment by producing a suction force that causes gas within the enclosure 412 to exit through the fluid outlet 426. Simultaneously or subsequently, the filler slurry 436 may be pulled through the fluid inlet 424 into the enclosure 412 due to the suction force applied by the vacuum pump 414. As the filler slurry 436 travels from the fluid inlet 424 to the fluid outlet 426, the filler slurry 436 coats the EBC/TBC 432 covering the mud cracks 434 (FIG. 10). Once the mud cracks 434 are covered with the filler slurry 436, the pressure may be increased within the enclosure 412 to cause infiltration of the mud cracks 434 and sintering may be performed to cure the filler slurry 436 therein and produce the cured filler material 438 within the mud cracks 434 (FIG. 11).

The methods and systems discussed herein may be used to produce various components having a substrate with an EBC/TBCs thereon that are substantially free of mud cracks and/or defects resulting from filling of such mud cracks. The cured filler within the mud cracks may have a composition that differs from the composition of the surrounding EBC/TBC or may have a composition that is the same or substantially similar to the EBC/TBC. In various embodiments, the substrate may include silicon nitride, and the EBC/TBC may include a rare earth disilicate. In various embodiments, the component may be configured to be installed in a turbine engine. If the EBC/TBC does include defects (e.g., cavities or voids) remaining within the filler mud cracks after performing the methods described herein, such defects may have a maximum dimension (e.g., diameter) of less than about 10 μm, that is, the component does not have any cavities remaining from the mud cracks that have a dimension greater than about 10 μm.

The systems and methods disclosed herein provide various benefits over certain existing systems and methods. For example, the components formed by the methods and system disclosed herein have EBC/TBCs with reduced crack initiating defects relative to components processed with conventional process. As such, the components are likely to exhibit enhanced mechanical properties due to the lack of defects in the EBC/TBCs.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A method comprising:
    locating a component within an enclosure of an apparatus, the component including a substrate and an environmental barrier coating and/or a thermal barrier coating (EBC/TBC) on the substrate, wherein the EBC/TBC includes mud cracks extending from an exterior surface of the EBC/TBC toward the substrate, wherein the mud cracks have a depth of between 50 micrometers and 3 millimeters and a width of between 50 micrometers and 3 millimeters;
    reducing pressure within the enclosure to a first pressure that is less than atmospheric pressure;
    applying a filler slurry to the exterior surface of the EBC/TBC such that the mud cracks are covered with the filler slurry while the component is within the enclosure and the EBC/TBC is exposed to the first pressure;
    increasing pressure within the enclosure to a second pressure that is greater than the first pressure, wherein the second pressure is sufficient to cause the filler slurry on the EBC/TBC to infiltrate into and fill the mud cracks; and
    sintering the filler slurry sufficient to cure the filler slurry within the mud cracks.

2. The method of claim 1, further comprising:
    producing the EBC/TBC on the substrate of the component from an EBC/TBC slurry; and
    producing the filler slurry by diluting the EBC/TBC slurry with a dilutant.

3. The method of claim 2, wherein the filler slurry is produced by diluting the EBC/TBC slurry with the dilutant sufficient to reduce a solid loading of the EBC/TBC slurry by between 1 to 5 wt. %.

4. The method of claim 1, wherein applying the filler slurry to the exterior surface of the EBC/TBC includes immersing the EBC/TBC in a reservoir of the filler slurry while the EBC/TBC is exposed to the first pressure.

5. The method of claim 1, wherein applying the filler slurry to the exterior surface of the EBC/TBC includes pouring the filler slurry onto the EBC/TBC while the EBC/TBC is exposed to the first pressure.

6. The method of claim 1, wherein applying the filler slurry to the exterior surface of the EBC/TBC includes applying the first pressure at a first end of the enclosure and introducing the filler slurry at a second end of the enclosure such that the filler slurry flows over the exterior surface of the EBC/TBC in a direction from the second end of the enclosure toward the first end of the enclosure.

7. The method of claim 1, wherein the first pressure is 1333 Pa or less.

8. The method of claim 1, wherein the second pressure is atmospheric pressure.

9. The method of claim 1, wherein the substrate comprises silicon nitride and the EBC/TBC comprises a rare earth disilicate.

10. The method of claim 1, wherein the component is configured to be installed in a turbine engine.

11. A component formed by a method comprising:
    locating the component within an enclosure of an apparatus, the component including a substrate and an environmental barrier coating and/or a thermal barrier coating (EBC/TBC) on the substrate, wherein the EBC/TBC includes mud cracks extending from an exterior surface of the EBC/TBC toward the substrate, wherein the mud cracks have a depth of between 50 micrometers and 3 millimeters and a width of between 50 micrometers and 3 millimeters;
    reducing pressure within the enclosure to a first pressure that is less than atmospheric pressure;
    applying a filler slurry to the exterior surface of the EBC/TBC such that the mud cracks are covered with the filler slurry while the component is within the enclosure and the EBC/TBC is exposed to the first pressure;
    increasing pressure within the enclosure to a second pressure that is greater than the first pressure, wherein the second pressure is sufficient to cause the filler slurry on the EBC/TBC to infiltrate into and fill the mud cracks; and
    sintering the filler slurry sufficient to cure the filler slurry within the mud cracks.

12. The component of claim 11, wherein the method further comprises:
    producing the EBC/TBC on the substrate of the component from an EBC/TBC slurry; and
    producing the filler slurry by diluting the EBC/TBC slurry.

13. The component of claim 11, wherein the substrate comprises silicon nitride and the EBC/TBC comprises a rare earth disilicate.

14. The component of claim 11, wherein the component is configured to be installed in a turbine engine.

15. The component of claim 11, wherein the component does not include any cavities remaining from the mud cracks that have a dimension greater than 10 µm.

16. The method of claim 1, further comprising forming the EBC/TBC on the substrate of the component using a direct sintering process that produces a pattern of the mud cracks in the EBC/TBC.

* * * * *